(12) United States Patent
Göring (10) Patent No.: US 7,204,349 B2
(45) Date of Patent: Apr. 17, 2007

(54) ROTOR SYSTEM FOR A BICYCLE (75) Inventor: Thomas Göring, Karlsruhe (DE)

(73) Assignee: Wolfgang Göring, Karlsruhe (DE)

( * ) Notice: Subject to any disclaimer, the term of this patent is extended or adjusted under 35 U.S.C. 154(b) by 132 days.

(21) Appl. No.: 10/997,251

(22) Filed: Nov. 24, 2004

(65) Prior Publication Data

US 2005/0115777 A1   Jun. 2, 2005

(30) Foreign Application Priority Data

Nov. 27, 2003 (DE) ............ 203 18 558 U
Mar. 8, 2004 (DE) ............ 10 2004 011 530
Oct. 27, 2004 (DE) ............ 10 2004 053 504

(51) Int. Cl.
*B62L 1/00* (2006.01)
(52) U.S. Cl. ............ 188/24.11; 280/279; 280/264
(58) Field of Classification Search ............ 188/24.11, 188/2 D, 344; 280/279, 280, 281.1, 274, 280/276, 238, 263, 264; 74/471 R, 473.1, 74/473.11, 473.13, 473.14, 473.3, 473.36, 74/473.37, 502.2, 500.5, 501.5 H, 501.5 R
See application file for complete search history.

(56) References Cited

U.S. PATENT DOCUMENTS

| 4,616,523 A | 10/1986 | Jones |
| 4,653,768 A | 3/1987 | Keys et al. |
| 4,753,448 A | 6/1988 | Nagashima |
| 4,770,435 A | 9/1988 | Cristie |
| 5,443,134 A * | 8/1995 | Gajek et al. ............ 188/344 |
| 5,615,585 A | 4/1997 | Chi |
| 5,992,869 A | 11/1999 | Yi-Chen |

(Continued)

FOREIGN PATENT DOCUMENTS

DE   297 08 975   8/1997

(Continued)

OTHER PUBLICATIONS

Brian Scura; SST ORYG™ Cable Installation & Adjustment, 1996, 2 pgs.

(Continued)

*Primary Examiner*—Pam Rodriguez
(74) *Attorney, Agent, or Firm*—Womble Carlyle Sandridge & Rice, PLLC (57) ABSTRACT

In a rotor system, in particular for a bicycle (1), with at least one first rotor (31) for the transmission of brake actuations, which is mounted in the area of a handlebar stem (12) of a fork (8), whose support is provided by a steering head tube (21), and which has two components (32, 51) that are rotatable with respect to each other without restriction, wherein one component (32) is in active connection with a brake actuation device and the other component (51) is in active connection with a brake, the first rotor (31) is mounted inside the steering head tube (21), which serves as a casing for the first rotor (31), or above the steering head tube (21), the transmission of the brake actuation takes place by way of a fluid (F) that penetrates to the first rotor (31), and the first rotor (31) has an external piece (51) mounted outside the handlebar stem (12) and an internal piece (32) mounted inside the handlebar stem (12) as components that are rotatable relative to each other.

50 Claims, 5 Drawing Sheets

U.S. PATENT DOCUMENTS 6,042,495 A * 3/2000 Patterson et al. ............. 474/80
6,224,079 B1    5/2001 Göring

FOREIGN PATENT DOCUMENTS

| | | |
|---|---|---|
| DE | 297 19 891 | 2/1998 |
| DE | 200 09 722 | 10/2000 |
| DE | 202 07 344 | 10/2002 |
| FR | 571 408 | 5/1924 |
| FR | 885 144 | 9/1943 |
| GB | 2 217 407 | 10/1989 |
| GB | 2 258 021 | 1/1993 |
| GB | 2 327 727 | 2/1999 |

OTHER PUBLICATIONS

Odyssey® GYRO2 Installation Instructions, 1 page, date unknown.

* cited by examiner

ROTOR SYSTEM FOR A BICYCLE

RELATED APPLICATIONS

The present application claims priority to, and entirely incorporates herein by reference, each of: DE 203 18 558.7, filed Nov. 27, 2003; DE 10 2004 011 530.3, filed Mar. 8, 2004; and DE 10 2004 053 504.3, filed Oct. 27, 2004.

BACKGROUND OF THE INVENTION

The present invention relates to a rotor system, particularly for a bicycle, with the rotor system including a rotor for transmitting brake actuations or clutch actuations, the rotor being mounted proximate a fork's handlebar stem that is supported by a steering head tube, the rotor having two components that can be rotated relative to each other without restriction, one of the components of the rotor being operatively connected with a brake actuation device or a gearshift actuation device, the other of the components of the rotor being operatively connected to a brake or a clutch, and the rotor being mounted above the steering head tube or inside the steering head tube.

A rotor system of the type described immediately above enables turning of the front wheel in steering motions of more than 180°, and is known from U.S. Pat. No. 6,224,079. U.S. Pat. No. 6,224,079 is incorporated herein by reference, in its entirety. In the known system, the rotor is mounted on the fork's stem. A first rotatable part of the rotor is connected to an upper brake cable that extends from a lever that is for causing a brake to actuate. A second rotatable part of the rotor is connected by a lower brake cable to the brake, which is assigned to the rear wheel. As a result, motion of the lever can be transmitted to the brake.

BRIEF SUMMARY OF SOME ASPECTS OF THE INVENTION

An aspect of the present invention is the provision of an alternative to the rotor system of the type described above. In accordance with one aspect, a rotor system is provided for a vehicle having a hydraulic actuator for being in fluid communication with, and actuating, at least one hydraulically-actuated component, such as hydraulically-actuated component selected from the group consisting of a brake and a clutch. In accordance with an aspect of the present invention, the rotor system includes a fork's handlebar stem that extends into a steering head tube and is mounted for rotating relative to the steering head tube, and a rotor mounted proximate the steering head tube. The rotor includes an internal piece mounted inside the handlebar stem and an external piece mounted outside the handlebar stem so that there can be substantially unrestricted relative rotation between the internal piece and the external piece. The internal piece and the external piece are operatively connected so that the fluid communication between the hydraulic actuator and the hydraulically-actuated component is at least partially via the rotor and is maintained while there is relative rotation between the internal piece and the external piece.

Because the transmission of the actuation of the brake or clutch takes place by means of a fluid, which also penetrates into the rotor, less space is required in this construction compared to that involving a purely mechanical solution. The required construction space is considerably reduced further by arranging the internal piece inside the handlebar stem, especially in a nonrotatable fashion, and by arranging the external piece correspondingly outside the handlebar stem. This saving of construction space is particularly advantageous if the rotor is arranged within a steering head tube for its protection against damage and for the protection of the bicycle's user against injuries. It is, however, also advantageous if the rotor is mounted outside the steering head tube. The rotor system is advantageous for mountain bikes or motocross machines due to its efficient use of space. Of course the rotor system can also be used in other two-wheelers, that is, in bicycles, motorcycles, and possibly in scooters or tricycles etc. In motorcycles, for instance, the rotor can transmit the actuation of the clutch.

The internal and the external pieces define, preferably between themselves, at least one chamber for a fluid, preferably an inner chamber and/or an inner connection and an outer chamber and/or an outer connection, which are in communication with each other by means of the fluid, in particular by way of a passageway through the wall of the handlebar stem. But otherwise, the rotor does not require much space in the radial direction. Preferably, the internal piece spans radially within the handlebar stem, preferably by means of a wedge segment, which fits closely on the main part of the internal piece by means of wedge-shaped beveled surfaces. Thus, displacement in the longitudinal direction of the handlebar stem, for example, on tightening of a screw joint, can build up radial compression/tension.

The active connection between the rotor and the brake actuating device (e.g., a manually operated lever) on the one hand, and the rotor and the brake on the other hand, takes place, preferably at least partially, that is, either completely or partially, via fluid-filled brake conduits (e.g., tubes), which are connected directly or indirectly, that is, for instance, through an intermediate element, to the rotor. In that case, the brake conduits are preferably in communication with the connections and chambers of the rotor by means of a fluid, so that a connected, impervious conduit system is realized. Whenever the term "impervious" is used in the following, it refers to leakage-proof in regard to the fluid. Preferably, the internal piece of the rotor at least partially defines a lateral free space or has a longitudinal channel in order to accommodate passage of a brake conduit or brake cable line that extends to the brake for the front wheel. This lateral free space or longitudinal channel associated with the internal piece of the rotor may be part of a fluid-impervious passageway for the brake conduit extending to the brake on the front wheel.

Apart from the rotor described above (e.g., the first rotor described above), a second rotor can optionally be provided for the transmission of gearshift operations, or the like. The second rotor, in addition to the first rotor, can be within the steering head tube, with the steering head tube supporting the fork and functioning as the casing for the rotors. The second rotor has two transmission elements that are rotatable relative to each other without restriction. One of the transmission elements of the second rotor is operatively connected with the device (e.g., a manually operated lever) used by the bicycle's rider for causing the gears to be changed. The other of the transmission elements of the second rotor is operatively connected to the device that ultimately causes the changing of the gears. The second rotor is preferably a purely mechanical device, so that operative connections mentioned in the two immediately preceding sentences are via flexible traction mechanisms.

It is also possible for the rotor system of the present invention to have only one rotor for the transmission of the actuation of the gear shifts, and no rotor for the transmission of the actuation of the brake, or that the rotors are mounted outside the steering head tube. The purely mechanical second rotor can be provided in motorcycles, for example, for controlling the gas throttle, and can thus transmit the actuation of the gas lever.

The second rotor can be made of plastic, which keeps the production costs very low. The second transmission element of the second rotor can be clipped, for example, onto the first transmission element of the second rotor. Flanges ensure the axial confinement and allow attachment of the flexible traction mechanisms.

The invention is not limited to specific dimensions of components, for example, a handlebar stem with a diameter of 28 mm or 38 mm. Further, to a large extent, the proportions of the parts in the different directions can be chosen freely.

The foregoing and other aspects of the present invention are described in the following.

DETAILED DESCRIPTION OF THE INVENTION

In the following, an exemplary embodiment of the present invention is described with reference to the drawings, in which like numerals refer to like parts throughout the several views.

Figure 1:
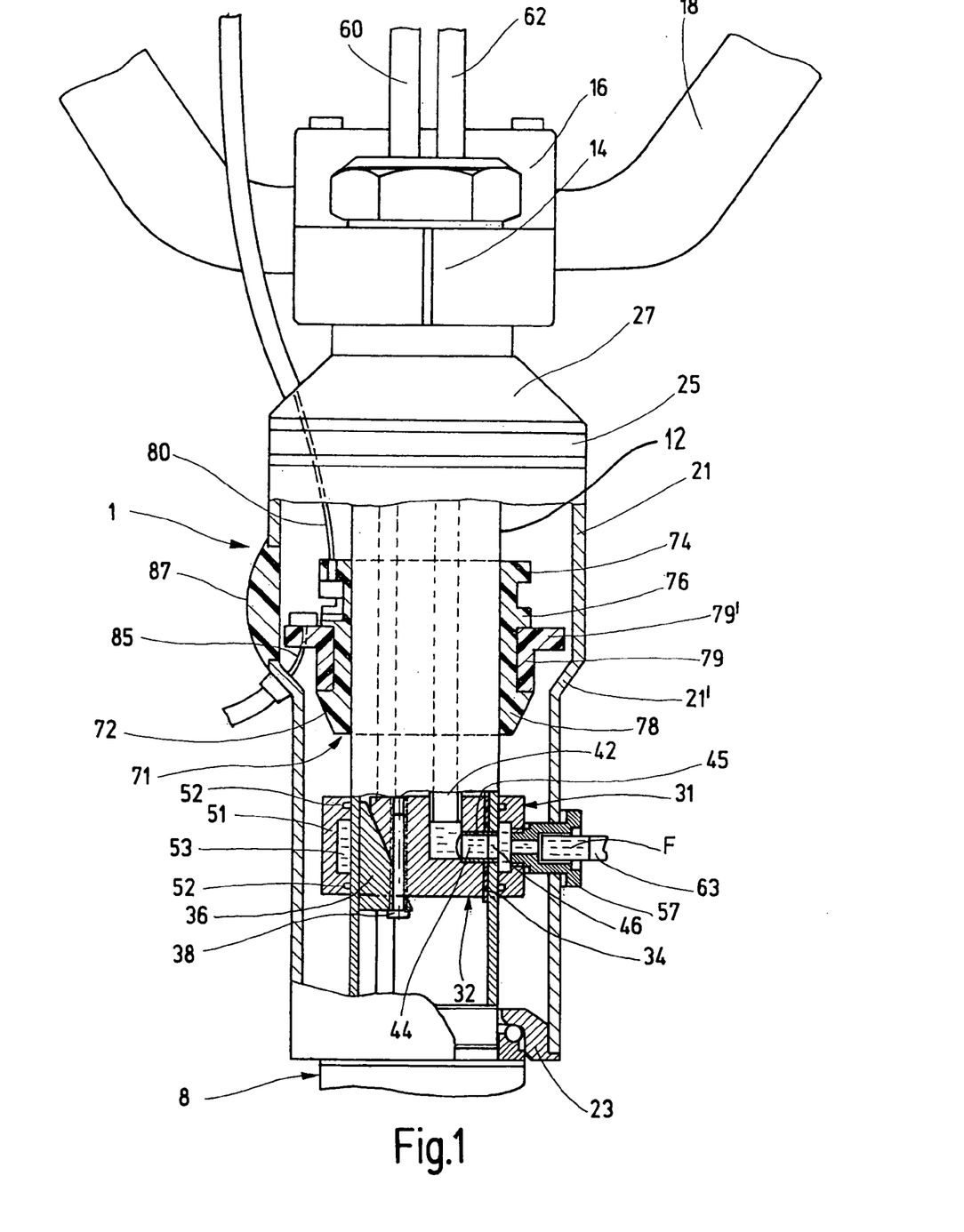
FIG. 1 is a partial sectional view of the illustrative embodiment, with the view being in the driving direction.
Figure 2:
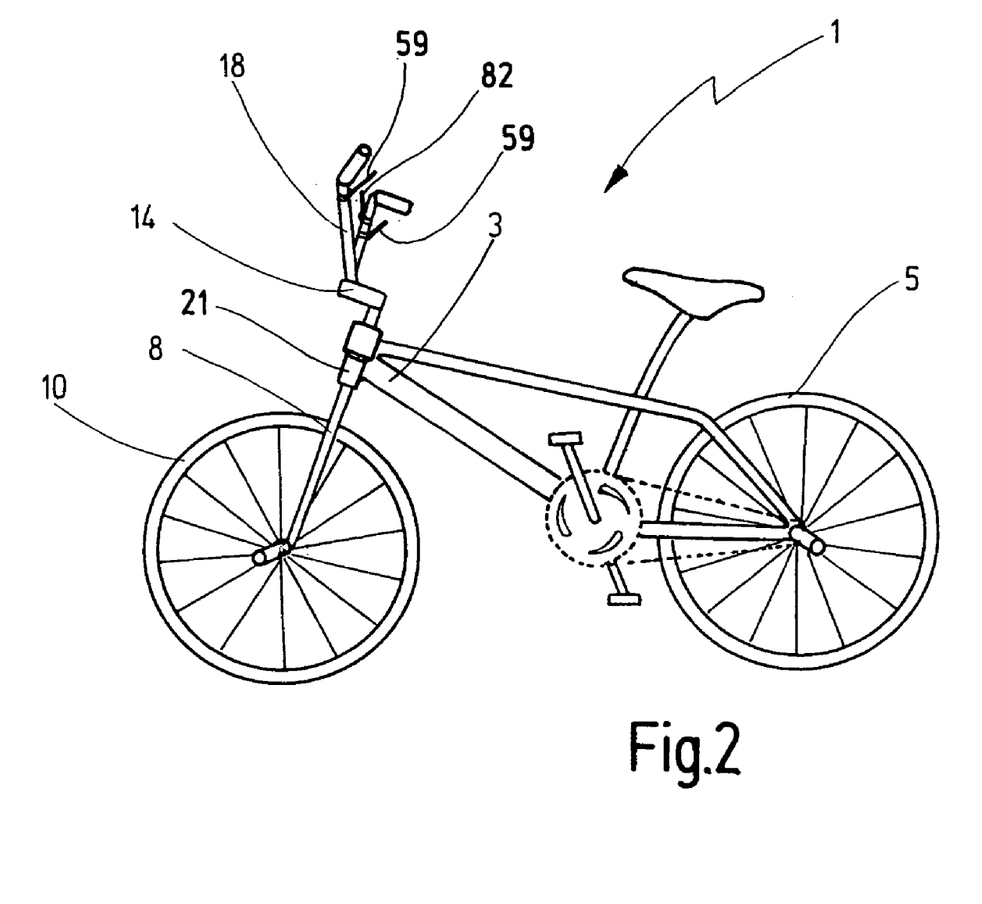
FIG. 2 is a side view of a bicycle equipped according to the invention.

A bicycle 1, which is constructed as a so-called mountain bike, has a frame 3, and the rear wheel 5 of the bicycle 1 is supported on the frame. At the front end of the frame 3, a fork 8 (e.g., forked shaft) is supported rotatably. The lower end of the fork 8 is supported by the front wheel 10 of the bicycle 1. The top end of the fork 8 is in the form of a handlebar stem 12, and a projection 14 is mounted at the upper end of the handlebar stem. The projection 14 comprises a horizontally extending handlebar receptacle 16, which extends around the handlebar 18 of the bicycle 1. The handlebar stem 12, with its circular/cylindrical symmetry, defines a directional frame of reference that is referred to below in this Detailed Description section of this disclosure.

A steering head tube 21, which is initially open at both ends, is fixed on the frame 3 for supporting the fork 8. The fork 8 extends substantially vertically. The steering head tube 21 comprises a lower part with a smaller, substantially circular/cylindrical, inner diameter (for example 44 mm), and an upper part with a larger, similarly substantially circular/cylindrical, inner diameter (for example 60 mm), and between these parts there is a conical section 21', which functions as the transition to allow for the enlargement of the diameter. Alternatively, when using a handlebar stem 12 with a diameter of 28 mm and a steering head tube 21 designed for a handlebar stem of 38 mm, a conical section will not be necessary, because the steering head tube 21 is already wide enough for the second rotor 71. The handlebar stem 12, which defines a longitudinal direction, is mounted concentrically inside the steering head tube 21 along a part of its length. A lower steering head set 23 and an upper steering head set 25 are built with several component parts and are rotatable, whereby each is fixed, on the outside, at the upper and lower ends, to the steering head tube 21, and on the inside, to the fork 8 and its handlebar stem 12. For example, upper and lower steering head sets are disclosed by U.S. Pat. No. 6,224,079, which has already been incorporated herein by reference. A conical hood 27 is mounted on the upper steering head set 25, between the upper steering head set 25 and the handlebar stem 12.

The first rotor 31, which is described in greater detail below, is mounted on the handlebar stem 12. The first rotor 31 is provided within the steering head tube 21 between the upper steering head set 25 and the lower steering head set 23. In particular, the first rotor 31 is in the lower part of the steering head tube 21 below the conical section 21'. The steering head tube 21, the two steering head sets 23 and 25, and the first rotor 31 are parts of a rotor system. For the first rotor 31, the steering head tube 21 forms the casing, which provides protection in the radial direction. In a modified version, the first rotor 31 sits on the open section of the handlebar stem 12 between the upper steering head set 25 and the projection 14, that is, above the steering head tube 21.

Figure 3:
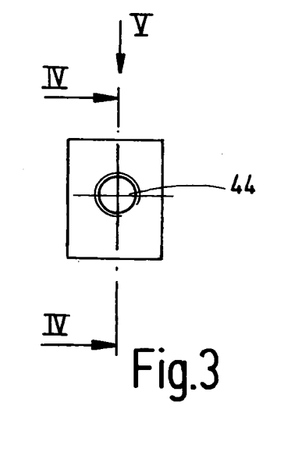
FIG. 3 is a side view of the main part of an internal piece without a wedge segment, with the view of FIG. 3 being in the direction of the arrow III in FIG. 5.
Figure 4:
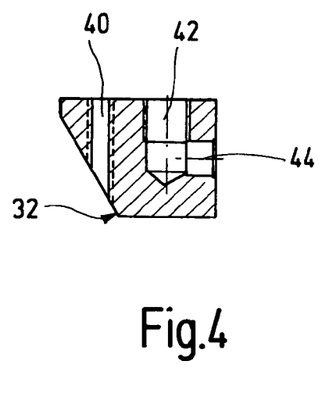
FIG. 4 is a cross section along the line IV—IV in FIGS. 3 and 5.
Figure 5:
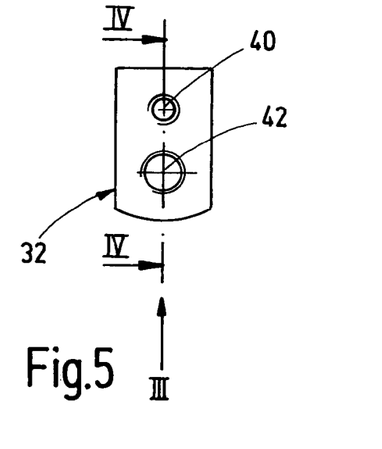
FIG. 5 is a top view of the main part of the internal piece in the direction of the arrow V in FIG. 3.

The first rotor 31 comprises two main components. The first rotor 31 includes, on one hand, an internal piece 32 that is flat at the bottom and the top, and on one side the internal piece 32 is constructed as a cylindrical section, with approximately the curvature of the handlebar stem 12. A rubber sealing mat 34 is provided as a stopper abutting against the cylindrical section of the internal piece 32. On the side of the main part of the internal piece 32 that is radially opposite the cylindrical section of the internal piece 32, there is a separate wedge segment 36. The wedge segment 36 has a wedge-shaped beveled surface that is upon a similar wedge-shaped beveled surface of the main part of the internal piece 32. The wedge segment 36 is fastened to the main part of the internal piece 32 with a fastening screw 38. The fastening screw 38 is screwed into a fastening opening 40 in the longitudinal direction of the internal piece 32. The other two sides of the internal piece 32 are flat and run parallel to the longitudinal axis.

An internal connection 42, in the form of a threaded hole, penetrating into the internal piece 32, is provided from above in the longitudinal direction parallel to the fastening hole 40. Due to the form of the internal piece 32, the inner connection 42 is staggered eccentrically with respect to the handlebar 12, that is, it lies eccentrically. The internal connection 42 leads to the radial, concealed hole-like bore, which is denoted as the inner chamber 44 in the following. Optionally, a hollow sleeve 45 is inserted fitting tightly, preferably crimped, into the inner chamber 44 in the radial direction. The internal piece 32 is pushed into the hollow handlebar stem 12, and is arranged radially within the handlebar stem 12. The sealing mat 34 is positioned between the internal piece 32 and the handlebar stem 12 such that the sealing mat 34 is adjacent/engaged against the inner wall of the handlebar stem 12. Upon tightening the fastening screw 38 and thereby moving the wedge segment 36, the radial size of the internal piece 32 within the handlebar stem 12 changes due to the wedge-shaped beveled surfaces. Resulting engagement against the inner wall of the handlebar stem 12 generates radial tension, which secures the internal piece 32 firmly in the handlebar stem 12, whereby the inner chamber 44 is sealed from the open area within the handlebar stem 12 due to the sealing mat 34 (and optionally the sleeve 45). In the wall of the handlebar stem 12, a radial opening/passage 46 is constructed. The passage 46 is contiguous with each of the inner chamber 44 (i.e., open to the inner chamber) and the sleeve 45 (e.g., within the sleeve). The sleeve 45 extends radially, preferably up to the outer end of the passage 46.

Figure 6:
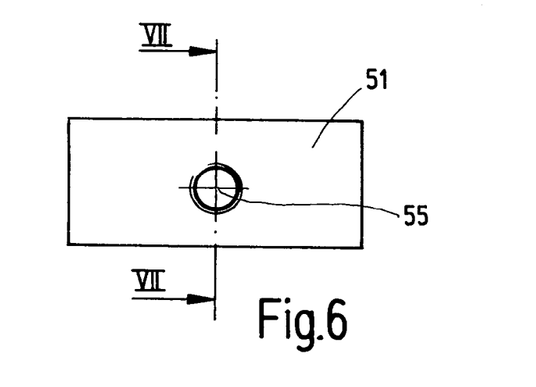
FIG. 6 is a side view of an external piece.
Figure 7:
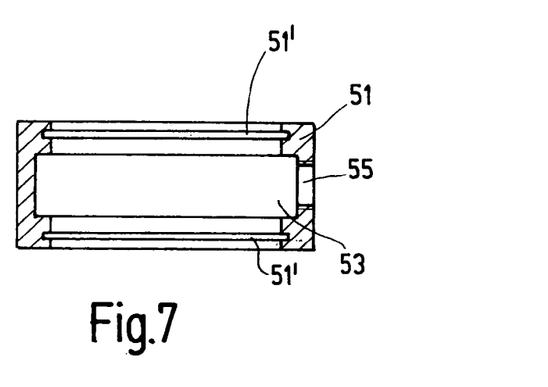
FIG. 7 is a cross section along the line VII—VII in FIG. 6.

The other main component of the first rotor 31 is a disc-shaped, hollow external piece 51, with substantially circular/cylinder symmetry. The external piece 51 has a ring groove 51' in the inner wall in the area of each of its two ends. Each ring groove 51' receives a sealing ring 52, with quadratic cross sections, for sealing between the interior surface of the external piece 51 and the exterior surface of the handlebar stem 12. In the middle area of the external piece 51, that is, between the ring grooves 51', with some additional space in-between, extends the internal wall of the external piece 51, displaced radially outward with respect to the central axis, for partially defining an outer chamber 53. The external piece 51 is pushed onto the outside of the handlebar stem 12, so that the middle axis of the external piece 51 extends along the longitudinal direction of the handlebar stem 12, and so that the external piece 51 is mounted at the same height as the internal piece 32. The external piece 51 thus extends around the internal piece 32, with the handlebar stem 12 positioned therebetween. The outer chamber 53 is defined by the radially outward displacement of the internal wall of the external piece 51 and the external wall of the handlebar stem 12. The outer chamber 53 is sealed, from the space defined between the external surface of the stem 12 and the internal surface of the steering head tube 21, by the sealing rings 52, even when there is relative rotation between the external piece 51 and the handlebar stem 12. The outer chamber 53 and the inner chamber 44 are connected to each other via the opening/passage 46. An external connection 55, in the form of a threaded bore penetrating through the wall of the external piece 51, is provided approximately in the middle of the external piece 51. On the right side of the bicycle 1, an adapter piece 57 with a projecting, hollow base is screwed in tightly from outside of the steering head tube 21 through its wall into the external connection 55. As a result, the external piece 51 is unrotatable relative to the steering head tube 21.

Two brake levers 59 are mounted on the grips of the handlebar 18, and the brake levers are at times more specifically referred to in the following as brake actuation devices 59 of a hydraulic brake system. From one brake lever 59, a first fluid-filled brake conduit 60 (e.g., tube) extends through a sealing cap on the projection 14, into the upwardly open handlebar stem 12. The first brake conduit 60 extends through the handlebar stem 12 in the longitudinal direction past the internal piece 32, and then onward toward the front wheel 10, where the first brake conduit is connected to a hydraulically operated brake. A second brake conduit 62 (e.g., tube) extends in similar fashion from the other brake lever 59 at the handlebar 18 to the handlebar stem 12 and is screwed tightly at its lower end into the inner connection 42.

A third brake conduit 63 (e.g., tube) is screwed tightly at its front end into the adapter piece 57 and extends from there to the rear wheel 5, where it is connected to a hydraulically operated brake. Preferably, the adapter piece 57 is a commercially available accessory for securing a hydraulic line, for example, a hollow screw attached coaxially to the brake conduit, or an adaptation of an accessory of that type. The second brake conduit 62, the inner chamber 44, the outer chamber 53 and the third brake conduit 63 are filled with the same incompressible fluid F and are connected with each other by means of the fluid as described herein.

If the user of the bicycle 1 intends to perform a steering motion, he will turn the fork 8 using the handlebar 18, and the front wheel 10 will turn with the fork 8. During this turning motion, the internal piece 32 of the first rotor 31, the first brake conduit 60, and the second brake conduit 62 rotate with the fork 8/handlebar stem 12, while the external piece 51 of the rotor 31 remains fixed on the frame 3. During the relative rotation between the inside piece 32 and the external piece 51, the volume of the chambers 44 and 53 is kept constant, so that the fluid F remains in the brake conduits without moving, and consequently the brakes are not actuated. Since no components are involved that would restrict the angle of the steering motion, the handlebar 18 can be rotated more than 360°.

If the user of the bicycle 1 intends to actuate the brake, the brake 10 of the front wheel is actuated, in the familiar manner, using the first brake conduit 60. When braking the rear wheel 5, the user compresses the fluid F in the second brake conduit 62 by means of the respective brake lever 59, whereby the pressure is transmitted via the fluid F into the inner chamber 44, passing through the opening/passage 46, the outer chamber 53, the hollow areas of the adapter piece 57, further to the fluid F in the third brake conduit 63, whereupon, finally, the brake for the rear wheel 5 is actuated. Since the volume of the chambers 44 and 53 during a steering motion, that is, during the turning of the internal piece 32 relative to the external piece 51, is maintained constant, it is possible to actuate the brake during a steering motion by means of the brake assigned to the rear wheel 5.

Figure 8:
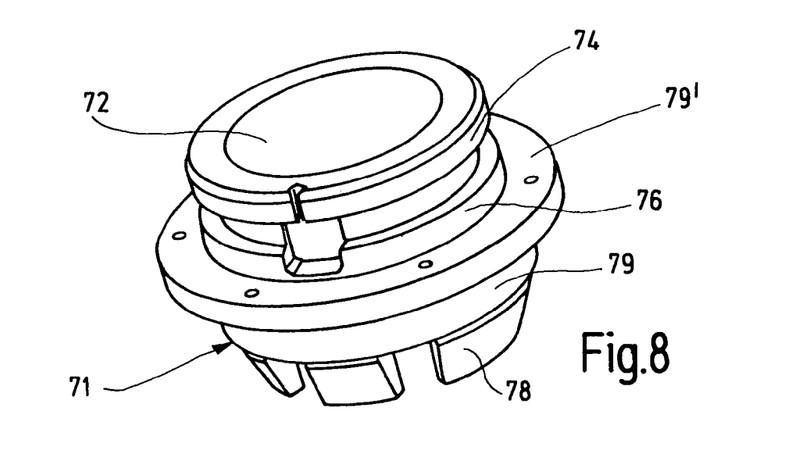
FIG. 8 is a perspective view of a second rotor.

In addition, the bicycle 1 in the illustrative design includes a gearshift. In order that it does not lead to a restriction to the steering motion, a second rotor 71 is provided. The second rotor 71 is mounted above the first rotor 31 within the steering head tube 21, and in particular in the area of the conical section 21' and above it. The second rotor 71 comprises a first transmission element 72 made of plastic and constructed as a socket. As illustrated in FIG. 1, the first transmission element 72 extends around and is in direct contact with the handlebar stem 12. Alternatively, the first transmission element 72 fits around and is glued to an intermediate pipe that extends around the handlebar stem 12. Either way, the entire second rotor 71 is capable of sliding, as a whole, in the longitudinal direction of the handlebar stem 12. The first transmission element 72 includes a coaxial arrangement of parts, namely a radially protruding upper flange 74, a radially protruding middle flange 76, and a group of six clip hooks 78. The clip hooks 78 are arranged side-by-side in the circumferential direction, and they are separated from each other by axial slits. An annular second transmission element 79, with a radially protruding third flange 79', is pushed over the clip hooks 78 during the assembly of the second rotor 71. As the second transmission element 79 is pushed over the clip hooks 78, the clip hooks deflect radially inwards, until the second transmission element 79 comes to lie between the middle flange 76 and the hook noses of the clip hooks 78, and the clip hooks grip the second transmission element 79. The second transmission element 79 thus surrounds the first transmission element 72. The two transmission elements 72 and 79 are rotatable relative to each other in the circumferential direction; however, they are not displaceable relative to each other in the axial and the radial directions. The two transmission elements 72 and 79 have good sliding properties, so that they can be easily rotated, and have high resistance against frictional heat.

Figure 9:
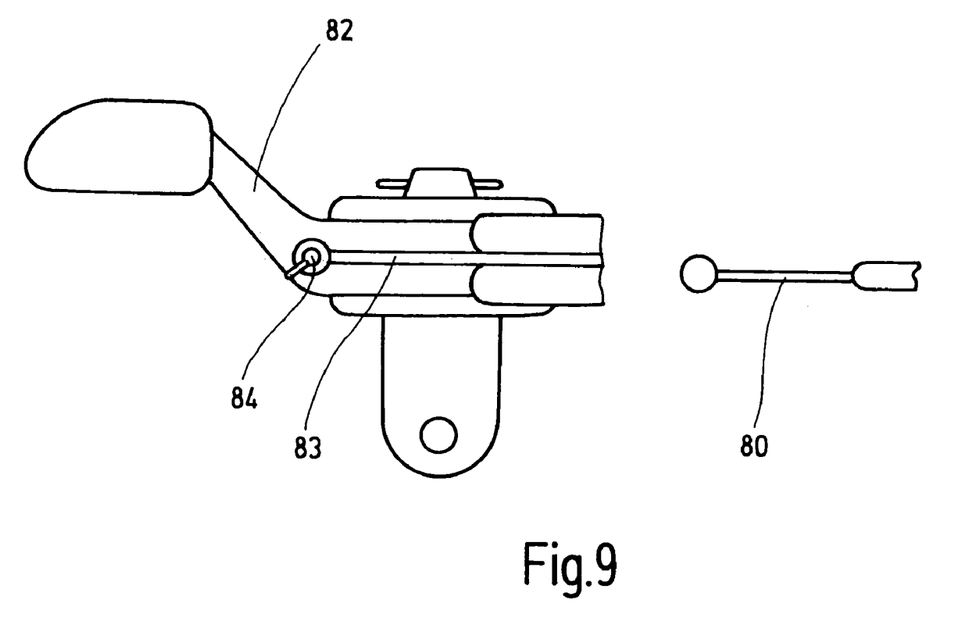
FIG. 9 is a view of the device for gear shift actuation before attaching the associated cable.

The first gear cable 80, which serves as a flexible traction mechanism and has fixed tail pieces (e.g., protuberances) at both ends, is hooked to the lever 82. The lever 82 is designated as the gearshift actuation device 82 in the following. The first gear cable 80 extends from the side of the gear shift actuation device 82 which faces away from the driver of the bicycle, along the groove 83 of the gear shift actuation device 82, to the in-slit opening 84 which is on the side of the gear shift actuation device 82 which faces the driver. The first gear cable 80 is secured to the side of the gear shift actuation device 82 which faces the driver by inserting the tail piece of the first gear cable 80 in the in-slit opening 84. The gear shift actuation device 82 is attached in the usual manner by means of a clamp to the gripping area of the handlebar 18. The first gear cable 80 extends from the handlebar 18, passing through the hood 27 and the first steering head set 25, to the steering head tube 21, where it is attached to the first transmission element 72 of the second rotor 71, such that it is hooked to its upper flange 74. In a modified version, the first gear cable 80 is attached indirectly to the first transmission element 72 through an intermediate element. A second gear cable 85 is laced into one of the six openings of the annular third flange 79' of the second transmission element 79 and extends along the left side of the bicycle 1, passing through the steering head tube 21, to the gear shifter at the rear wheel 5. The gear shifter at the rear wheel is actuated in the usual manner. A plastic cap 87, on the left side of the bicycle 1, closes an opening in the steering head tube 21. The cap 87 is removed to provide access to the opening and thereby the second rotor 71, for the purpose of assembling.

Analogous to the first rotor 31, because of the possibility of unrestricted relative rotation between the first transmission element 72 and the second transmission element 79, a steering motion of more than 360° is also possible for the second rotor 71 without actuation of the gear shifter, and correspondingly, actuation of the gear shifter independently of the steering motion is possible, whereby the second rotor 71 moves in the longitudinal direction of the handlebar stem 12. In the normal position of the handlebar 18 and the second rotor 71, that is, in case of a straight ahead driving without tricks, the ends of the gear cables 80 and 85 that are within the steering head tube 21 are on the left side of the bicycle 1.

Figure 10:
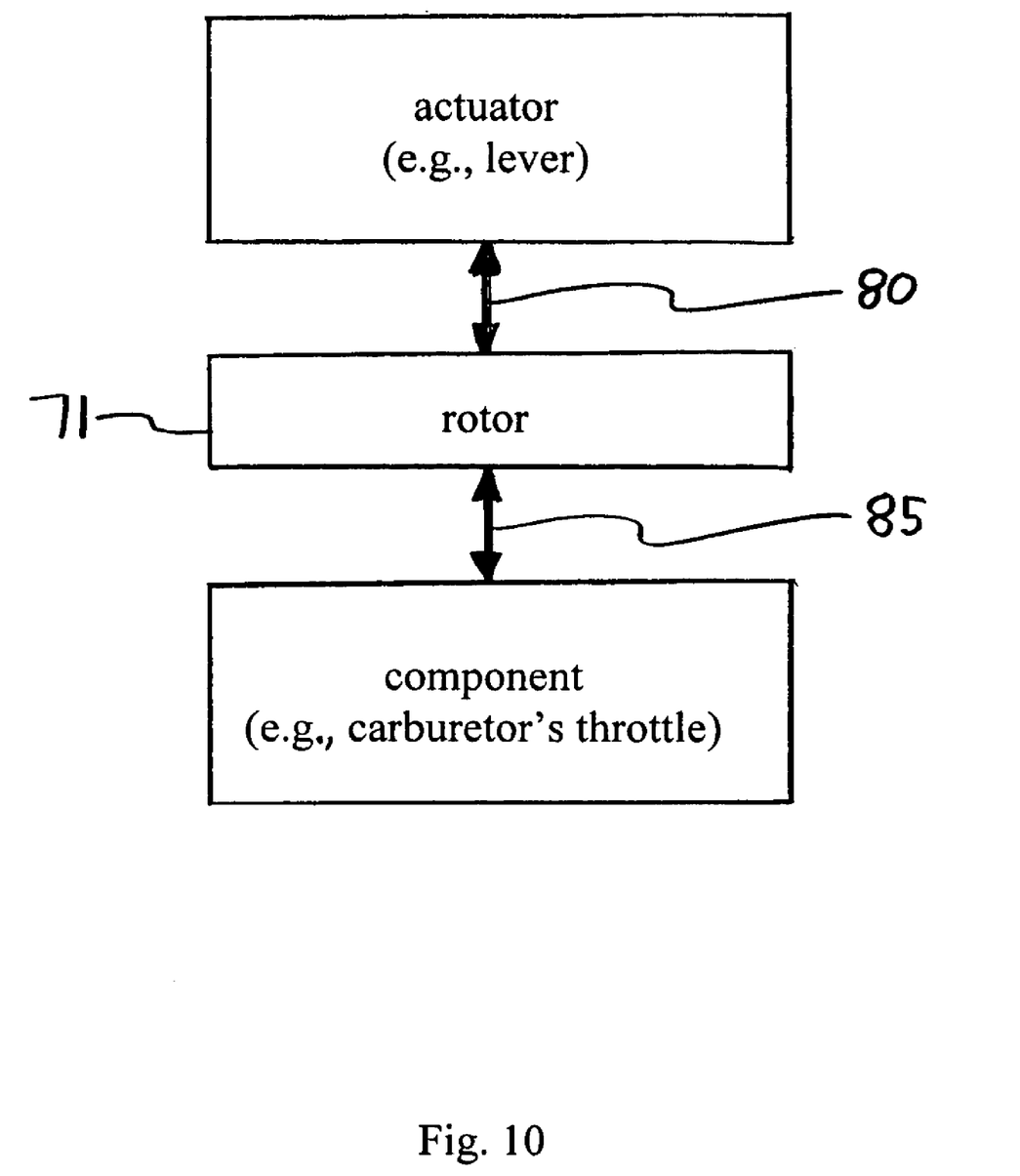
FIG. 10 schematically illustrates an actuator actuating a component by way of a rotor.

In accordance with the exemplary embodiment of the present invention: each of the first conduit 60, second conduit 62, third conduit 63, first cable 80 and second cable 85 is conventional and will be understood by those of ordinary skill in the art; the ends of the first and second conduits 60, 62 that are proximate the handlebar 18 can be respectively conventionally connected to conventional devices (e.g., lever-operated hydraulic actuators) as will be understood by those of ordinary skill in the art; the other end of the first conduit 60 and the end of the third conduit 63 that is not shown in FIG. 1 can be respectively conventionally connected to conventional hydraulically-actuated components (e.g., brakes and/or a clutch) as will be understood by those of ordinary skill in the art; the end of the first cable 80 that is not shown in FIG. 1 can be conventionally connected to a conventional device (e.g., a lever) as will be understood by those of ordinary skill in the art; and the end of the second cable 85 that is not shown in FIG. 1 can be conventionally connected to a conventional device (e.g., a gear shifter, a carburetor's throttle or a brake) in a conventional manner as will be understood by those of ordinary skill in the art. For example. FIG. 10 schematically illustrates an actuator (e.g., lever) actuating a component (e.g., carburetor's throttle) by way of the rotor 71 and cables 80 and 85.

It will be understood by those skilled in the art that while the present invention has been discussed above with reference to embodiments, various additions, modifications and changes can be made thereto without departing from the spirit and scope of the invention as set forth in the following claims.

What is claimed is:

1. A rotor system for a vehicle having at least one hydraulic actuator for being in fluid communication with, and thereby actuating, at least one hydraulically-actuated component selected from the group consisting of a brake and a clutch, the rotor system comprising:
   a steering head tube;
   a handlebar stem that extends from a fork, wherein the handlebar stem extends into the steering head tube and is mounted for rotating relative to the steering head tube; and
   a rotor mounted proximate the steering head tube, with the rotor including an internal piece mounted inside the handlebar stem and an external piece mounted outside the handlebar stem so that there can be substantially unrestricted relative rotation between the internal piece and the external piece, wherein the internal piece and the external piece are operatively connected so that
      the fluid communication between the hydraulic actuator and the hydraulically-actuated component is at least partially via the rotor, and
      the fluid communication between the hydraulic actuator and the hydraulically-actuated component at least partially via the rotor is maintained while there is relative rotation between the internal piece and the external piece.

2. The rotor system according to claim 1, wherein the external piece and a portion of the handlebar stem extend around the internal piece, and the portion of the handlebar stem is positioned between the external piece and the internal piece.

3. The rotor system according to claim 2, wherein at least one of the internal piece and the external piece defines at least one chamber for at least partially providing the fluid communication between the hydraulic actuator and the hydraulically-actuated component.

4. The rotor system according to claim 2, wherein
   the internal piece at least partially defines
      an inner chamber for at least partially providing the fluid communication between the hydraulic actuator and the hydraulically-actuated component, and/or
      an inner connection for at least partially providing the fluid communication between the hydraulic actuator and the hydraulically-actuated component; and
   the external piece at least partially defines
      an outer chamber for at least partially providing the fluid communication between the hydraulic actuator and the hydraulically-actuated component, and/or
      an external connection for at least partially providing the fluid communication between the hydraulic actuator and the hydraulically-actuated component.

5. The rotor system according to claim 2, wherein
the internal piece at least partially defines an inner chamber for at least partially providing the fluid communication between the hydraulic actuator and the hydraulically-actuated component;
the external piece at least partially defines an outer chamber for at least partially providing the fluid communication between the hydraulic actuator and the hydraulically-actuated component;
a wall of the handlebar stem defines an opening; and
the inner chamber is in fluid communication with the outer chamber at least partially via the opening in the wall of the handlebar stem.

6. The rotor system according to claim 1, further comprising:
a first tube, wherein fluid communication between the hydraulic actuator and the rotor is at least partially via the first tube; and
a second tube, wherein fluid communication between the rotor and the hydraulically-actuated component is at least partially via the second tube.

7. The rotor system according to claim 6, wherein
the internal piece at least partially defines an inner chamber for at least partially providing the fluid communication between the hydraulic actuator and the hydraulically-actuated component;
the external piece at least partially defines an outer chamber for at least partially providing the fluid communication between the hydraulic actuator and the hydraulically-actuated component;
fluid communication between the hydraulic actuator and the inner chamber is at least partially via the first tube; and
fluid communication between the outer chamber and the hydraulically-actuated component is at least partially via the second tube.

8. The rotor system according to claim 7, wherein
the internal piece comprises an inner connection to which the first tube is connected; and
the external piece comprises an external connection to which the second tube is connected.

9. The rotor system according to claim 6, wherein a passageway is defined between the internal piece and the handlebar stem's inner wall, an elongate element extends through the passageway, and the elongate element is selected from the group consisting of
a hydraulic line for controlling a brake, and
a cable for controlling a brake.

10. The rotor system according to claim 1, wherein the internal piece is mounted to the handlebar stem in a manner that prevents relative rotation between the internal piece and the handlebar stem.

11. The rotor system according to claim 10, wherein the internal piece at least partially spans the handlebar stem's internal space.

12. The rotor system according to claim 11, further comprising a sealing mat positioned between the internal piece and the handlebar stem's inner wall.

13. The rotor system according to claim 1, wherein the internal piece comprises a wedge-shaped segment.

14. The rotor system according to claim 13, wherein a movement of the wedge-shaped segment of the internal piece relative to a second part of the internal piece changes the internal piece's radial dimension.

15. The rotor system according to claim 13, wherein the internal piece further comprises a threaded fastener mounted for causing the wedge-shaped segment to move in the handlebar stem's lengthwise direction when the fastener is tightened, and the internal piece's radial dimension changes in response to the movement of the wedge-shaped segment in the handlebar stem's lengthwise direction.

16. The rotor system according to claim 1, further comprising a radially extending sleeve inserted into the internal piece.

17. The rotor system according to claim 16, wherein the sleeve extends at least partially into a wall of the handlebar stem, and is for at least partially providing the fluid communication between the hydraulic actuator and the hydraulically-actuated component.

18. The rotor system according to claim 1, further comprising:
upper and lower steering head sets respectively at upper and lower ends of the steering head tube and by way of which the handlebar stem is rotatably mounted to the steering head tube, and
a handlebar mounted to the handlebar stem's upper end.

19. The rotor system according to claim 18, wherein the external piece is mounted to the steering head tube in a manner that prevents the external piece from rotating relative to the steering head tube.

20. The rotor system according to claim 19, wherein the external piece is positioned in the steering head tube.

21. The rotor system according to claim 1, wherein
the rotor is a first rotor;
the rotor system further comprises a second rotor that is mounted proximate the steering head tube for transmitting actuations selected from the group consisting of gearshift actuations and throttle actuations;
the second rotor includes a first transmission element and a second transmission element that are mounted so that there can be substantially unrestricted relative rotation between the first transmission element and the second transmission element;
the first transmission element is operatively connected to a lever for providing said actuations; and
the second transmission element is operatively connected to a device controlled by said actuations, wherein said device is selected from the group consisting of a gear shifter and a carburetor.

22. The rotor system according to claim 1 in combination with the vehicle, wherein the vehicle is a bicycle or a tricycle.

23. The rotor system according to claim 1, wherein the rotor is positioned in the steering head tube.

24. The rotor system according to claim 1, further comprising a fitting that extends through an opening in the steering head tube and is connected to the external piece.

25. The rotor system according to claim 1, wherein the external piece is fixedly mounted to the steering head tube, and the internal piece is fixedly mounted to the handlebar stem, whereby the internal piece rotates with the handlebar stem relative to the steering head tube and the external piece.

26. The rotor system according to claim 1, wherein the at least one hydraulically-actuated component is a brake.

27. The rotor system according to claim 1, wherein the at least one hydraulically-actuated component is a clutch.

28. A rotor system for a vehicle having at least a first actuator and a second actuator for being operatively connected to, and thereby actuating, at least a first component and a second component, respectively, the rotor system comprising:

a steering head tube;
a handlebar stem that extends from a fork, wherein the handlebar stem extends into the steering head tube and is mounted for rotating relative to the steering head tube;
a first rotor mounted proximate the steering head tube for transmitting actuations from the first actuator to the first component, wherein
the first rotor includes a first transmission element and a second transmission element that are mounted so that there can be substantially unrestricted relative rotation between the first transmission element and the second transmission element,
the first transmission element is operatively connected to the first actuator, and
the second transmission element is operatively connected to the first component; and
a second rotor mounted proximate the steering head tube for transmitting actuations from the second actuator to the second component, wherein
the second rotor includes a third transmission element and a fourth transmission element that are mounted so that there can be substantially unrestricted relative rotation between the third transmission element and the fourth transmission element,
the third transmission element is operatively connected to the second actuator, and
the fourth transmission element is operatively connected to the second component.

29. The rotor system according to claim 28, wherein the entire first rotor is displaceable with respect to the handlebar stem along the handlebar stem's longitudinal direction.

30. The rotor system according to claim 28, wherein the first and second transmission elements are undisplaceable with respect to each other in the handlebar stem's longitudinal direction.

31. The rotor system according to claim 28, wherein the first transmission element extends around the handlebar stem and can be moved along the handlebar stem in the longitudinal direction.

32. The rotor system according to claim 28, wherein the second transmission element extends around the first transmission element.

33. The rotor system according to claim 28, wherein the second transmission element is clipped to the first transmission element.

34. The rotor system according to claim 28, wherein the first and second transmission elements are plastic.

35. The rotor system according to claim 28, wherein the first rotor is purely mechanical, the first transmission element is operatively connected to the first actuator at least partially via a first flexible traction mechanism, and the second transmission element is operatively connected to the first component at least partially via a second flexible traction mechanism.

36. The rotor system according to claim 35, wherein the first flexible traction mechanism comprises a first cable, and the second flexible traction mechanism comprises a second cable.

37. The rotor system according to claim 36, wherein the first cable includes a first end and a second end, a first protuberance is fixedly attached at the first end for attaching the first cable to the first actuator, and a second protuberance is fixedly attached at the second end for attaching the first cable to the first transmission element.

38. The rotor system according to claim 37, wherein the first actuator comprises a lever that includes a slit for receiving the first cable.

39. The rotor system according to claim 35, wherein the first and second flexible traction mechanisms each extend into the steering head tube and are positioned proximate a first side of the steering head tube.

40. The rotor system according to claim 28, wherein the first and second transmission elements include flanges that are for fastening to flexible traction mechanisms and/or keeping the first and second transmission elements undisplaceable with respect to each other along the handlebar stem's longitudinal direction.

41. The rotor system according to claim 28, wherein at least one opening is provided in a sidewall of the steering head tube for at least partially facilitating assembling associated with the first rotor.

42. The rotor system according to claim 28 in combination with the vehicle, wherein the vehicle is a bicycle or a tricycle.

43. The rotor system according to claim 28, wherein:
the first rotor is positioned in the steering head tube, and
the second rotor is positioned in the steering head tube.

44. The rotor system according to claim 28, wherein the second component is a throttle.

45. The rotor system according to claim 28, wherein the second component is a gear shifter.

46. The rotor system according to claim 28, wherein:
the first component is selected from the group consisting of a brake and a clutch, and
the second component is selected from the group consisting of a gear shifter and a throttle.

47. The rotor system according to claim 28, wherein the first rotor is a hydraulic rotor.

48. The rotor system according to claim 47, wherein:
the first component is a hydraulically-actuated component; and
the first actuator is a hydraulic actuator for being in fluid communication with, and thereby actuating, the hydraulically-actuated component,
the first transmission element comprises an internal piece mounted inside the handlebar stem,
the second transmission element comprises an external piece mounted outside the handlebar stem, and
the internal piece and the external piece are operatively connected so that
the fluid communication between the hydraulic actuator and the hydraulically-actuated component is at least partially via the hydraulic rotor, and
the fluid communication between the hydraulic actuator and the hydraulically-actuated component at least partially via the hydraulic rotor is maintained while there is relative rotation between the internal piece and the external piece.

49. The rotor system according to claim 48, wherein:
the external piece and a portion of the handlebar stem extend around the internal piece, and
the portion of the handlebar stem is positioned between the external piece and the internal piece.

50. The rotor system according to claim 49, wherein at least one of the internal piece and the external piece defines at least one chamber for at least partially providing the fluid communication between the hydraulic actuator and the hydraulically-actuated component.

* * * * *